United States Patent
Loehr et al.

(10) Patent No.: US 11,496,520 B2
(45) Date of Patent: Nov. 8, 2022

(54) METHOD FOR OPERATING A COMMUNICATIONS SYSTEM

(71) Applicant: Robert Bosch GmbH, Stuttgart (DE)

(72) Inventors: Hans Loehr, Stuttgart (DE); Marco Andreas Wagner, Talheim (DE); Michael Ernst Doering, Hildesheim (DE); Rene Guillaume, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 16/834,852

(22) Filed: Mar. 30, 2020

(65) Prior Publication Data

US 2020/0358824 A1  Nov. 12, 2020

(30) Foreign Application Priority Data

May 10, 2019 (DE) .......................... 102019206815.4

(51) Int. Cl.
*H04L 9/40* (2022.01)
*H04L 41/08* (2022.01)

(52) U.S. Cl.
CPC .............. *H04L 63/20* (2013.01); *H04L 41/08* (2013.01); *H04L 63/0209* (2013.01)

(58) Field of Classification Search
CPC .................................................. H04L 41/0893
See application file for complete search history.

(56) References Cited

U.S. PATENT DOCUMENTS

| | | | | |
|---|---|---|---|---|
| 2012/0233668 | A1* | 9/2012 | Leafe | G06F 9/44526 726/4 |
| 2015/0188767 | A1* | 7/2015 | Li | H04L 41/12 370/254 |
| 2015/0200859 | A1* | 7/2015 | Li | H04L 43/0876 370/235 |
| 2016/0205071 | A1* | 7/2016 | Cooper | H04L 63/0209 726/1 |
| 2017/0238134 | A1* | 8/2017 | Nel | H04W 4/022 455/456.3 |
| 2018/0041470 | A1* | 2/2018 | Schultz | H04L 47/24 |
| 2018/0316730 | A1* | 11/2018 | Schaefer | H04L 41/0803 |
| 2019/0089741 | A1* | 3/2019 | Hill | H04L 63/0428 |
| 2019/0089742 | A1* | 3/2019 | Hill | H04L 63/1433 |
| 2019/0132331 | A1* | 5/2019 | Pignorel | H04W 12/08 |
| 2020/0007396 | A1* | 1/2020 | Fainberg | H04L 43/045 |
| 2020/0358813 | A1* | 11/2020 | Hasumi | H04L 63/1441 |

* cited by examiner

*Primary Examiner* — Schquita D Goodwin
*Assistant Examiner* — Jonathan A Sparks
(74) *Attorney, Agent, or Firm* — Norton Rose Fulbright US LLP; Gerard Messina

(57) ABSTRACT

A method for operating a communications system, in particular a communications system based on software-defined networking, which has at least one network infrastructure component, in particular an SDN switch, and at least one communications device, the network infrastructure component being developed for forwarding data to and/or from the at least one communications device. The method includes the following steps: allocating the communications device to at least one security zone; specifying at least one forwarding rule for forwarding data by the network infrastructure component to and/or from the communications device, the specification of the forwarding rule taking place under consideration of the security zone.

19 Claims, 2 Drawing Sheets

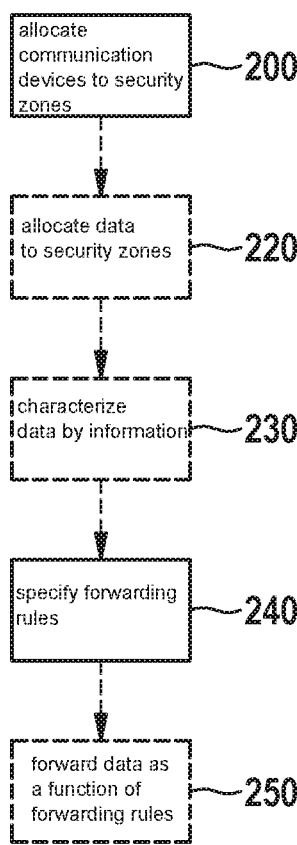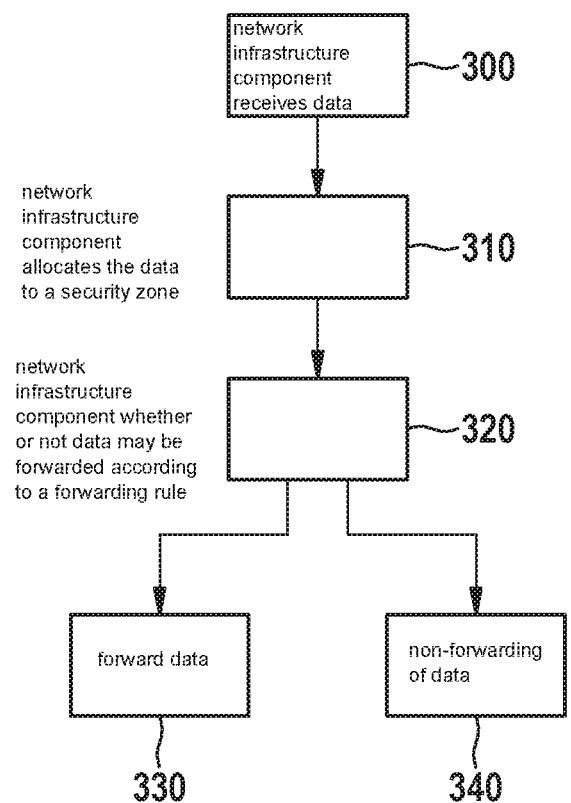
Fig. 2
Fig. 3

METHOD FOR OPERATING A COMMUNICATIONS SYSTEM

CROSS REFERENCE

The present application claims the benefit under 35 U.S.C. § 119 of German Patent Application No. DE 102019206815.4 filed on May 10, 2019, which is expressly incorporated herein by reference in its entirety.

BACKGROUND INFORMATION

The present invention relates to a method and a device for operating a communications system, in particular a communications system based on software-defined networking (SDN).

In addition, the present invention relates to a communications system, in particular a communications system based on software-defined networking (SDN), and to a network infrastructure component, in particular an SDN switch, of a communications system.

It is desirable to control and improve the data exchange within the communications system with regard to compliance with security specifications.

SUMMARY

The present invention relates to devices and methods for allocating communications devices of a communications system, in particular a communications system based on software-defined networking (SDN), as well as data to security zones, and to the specification of forwarding rules as a function of the security zones.

Security zones are areas that especially include a plurality of communications devices, with uniform security requirements within the security zones. Such areas are separated from other areas for security reasons. The communication into a security zone or out of a security zone is specified by appropriate security requirements and preferably controlled.

Software-defined networking is to be understood as an approach for a network architecture or a communications architecture in which two main functionalities, a control plane and a data plane, are separated from each other and abstracted.

Software-defined networking architectures allow for a different treatment of individual data and/or data streams as well as a global view on the structure of the communications system. This makes it possible to make decisions that are optimized for the entire system.

In a communications system of this type, a forwarding rule uniquely specifies the forwarding of received data from input ports to certain output ports of a network infrastructure component of the communications system. Network infrastructure components, for example, are switches or gateways.

The forwarding rule is advantageously predefined by a logically centralized control instance, in particular a software-defined networking (SDN) controller, and distributed to the network infrastructure components.

Moreover, an SDN-based communications system for vehicles or industrial plants is able to be operated in combination with time-sensitive networking mechanisms, the latter controlling the real-time-relevant data traffic, and the software-defined networking components providing mechanisms available for influencing the processing and forwarding functions in the network infrastructure components.

According to one specific embodiment of the present invention, an example method for operating a communications system, in particular a communications system based on software-defined networking (SDN), which includes at least one network infrastructure component, in particular an SDN switch, and at least one communications device, the network infrastructure component being developed for forwarding data to and/or from the at least one communications device, has the following steps:

Allocating the communications device to at least one security zone;

Specifying at least one forwarding rule for forwarding data through the network infrastructure component to and/or from the communications device, the specification of the forwarding rule being carried out under consideration of the security zone.

Preferably, an allocation of data to at least one security zone is also provided. In an advantageous manner, data are able to be forwarded within the allocated security zone and/or into the allocated security zone. Data that are allocated to this security zone are advantageously able to be forwarded within a security zone or into a security zone. The forwarding of data out of their allocated security zone is advantageously able to be denied.

A network infrastructure component and the communications devices connected to the network infrastructure component form a subnet of specific communications devices having a common superposed task, for example. Toward this end, some data are transmitted only inside this subnetwork, for instance. Ethernet, especially automotive Ethernet or some other bus system typical of automobiles, for example, may be used in a subnet, e.g., a controller area network bus, CAN.

The example communications system advantageously has at least one first and one second subnet, and a communications device of the first subnet and a communications device of the second subnet are allocated to a shared security zone. Because of the global view on structures of the SDN-based communications system, it is possible to set up security zones that cross the boundaries of subnets so that the involved communications devices may be located in different subnets. As a result of the global view, forwarding rules are able to be specified that are adapted across the involved network infrastructure components and are therefore able to control the subnet-spanning data exchange.

According to one advantageous embodiment of the present invention, the example method, or individual steps of the example method, is/are able to be carried out in different operating states of the communications system, e.g., prior to the initial operation and also during a running application of the communications system, for instance through a continuous calculation/optimization or in response to changes in the communications system.

In an advantageous manner, the allocating of data and/or the allocating of communications devices to security zones is carried out dynamically during a running application of the communications system.

It is advantageously provided in accordance with the present invention that data are characterized by information that allows the data to be allocated to at least one security zone. The use of tags, for example, is realized by extending a data frame.

It is advantageously provided in accordance with the present invention that the specification of a forwarding rule includes the distribution of the forwarding rule to the network infrastructure component.

It is advantageously provided in accordance with the present invention that the specification of the forwarding rule includes defining the forwarding rule.

It is advantageously provided in accordance with the present invention that the forwarding rule is defined as a function of data to be forwarded and/or as a function of at least one communications path of the communications system and/or at least one application of the communications system.

The specification of the forwarding rule advantageously takes place dynamically during a running application of the communications system. This advantageously allows for a dynamic adaptation of the forwarding rule and thereby makes it possible, for example, to temporarily permit exceptions in the forwarding or non-forwarding for certain data.

The network infrastructure component advantageously forwards the data to and/or from the at least one communications device as a function of the forwarding rule. The forwarding as a function of the forwarding rule also includes the non-forwarding of data in the event that this is not permitted by a corresponding forwarding rule.

Another embodiment of the present invention provides a 'secure by default approach', in which the network infrastructure components do not forward data as a matter of principle except if a forwarding rule is specified for forwarding the corresponding data.

Further preferred embodiments of the present invention include an example device for operating a communications system, in particular a communications system based on software-defined networking (SDN), which has at least one network infrastructure component, in particular an SDN switch, and at least one communications device, the network infrastructure component being developed for forwarding data to and/or from the at least one network infrastructure component, and the example device being configured to execute the following steps:

Allocating the communications device to at least one security zone;

Specifying at least one forwarding rule for forwarding data via the network infrastructure component to and/or from the communications device, the specification of the forwarding rule taking place under consideration of the security zone.

In further preferred specific embodiments of the present invention, the device for carrying out the present method is developed according to the specific embodiments.

In further preferred specific embodiments of the present invention, the device is a logically centralized control instance of the SDN-based communications system, in particular an SDN controller.

Further preferred specific embodiments of the present invention include an example network infrastructure component, in particular an SDN switch, of a communications system, in particular of a communications system based on software-defined networking (SDN), the network infrastructure component being developed to carry out the method according to the specific embodiments.

Additional preferred specific embodiments of the present invention include a computer program, which includes computer-readable instructions that when executed by a computer, run the method according to the specific embodiments.

Further preferred specific embodiments of the present invention include a communications system, in particular a communications system based on software-defined networking (SDN), which includes at least one device according to the specific embodiments and/or at least one network infrastructure component, in particular an SDN switch, according to the specific embodiments, as well as at least one communications device.

Additional preferred specific embodiments of the present invention include the use of the method according to the specific embodiments and/or the device according to the specific embodiments and/or the computer program according to the specific embodiments for the configuration of a communications system or the communications system according to the specific embodiments.

In an advantageous manner, the example method according to the specific embodiments of the present invention and/or the example device according to the specific embodiments of the present invention and/or the example computer program according to the specific embodiments of the present invention and/or the example communications system according to the specific embodiments of the present invention is/are suitable for use in a network for a motor vehicle and/or in an industrial network such as an industrial production plant.

The principle according to the specific embodiments is able to be used in all areas in which security-critical communication is to be monitored. Among others, such areas are the industrial production and also networks inside motor vehicles.

Additional features, application possibilities and advantages of the present invention result from the description below of exemplary embodiments of the present invention, which are shown in the figures. All described or illustrated features form the subject matter of the present invention, either on their own or in any combination, regardless of their combination or their wording or representation in the specification and/or the figures.

BRIEF DESCRIPTION OF THE DRAWINGS

FIG. 2 shows schematically, a simplified flow diagram of a method according to further preferred specific embodiments of the present invention.

FIG. 3 shows schematically, a simplified flow diagram of a further method according to further preferred specific embodiments of the present invention.

DETAILED DESCRIPTION OF EXAMPLE EMBODIMENTS

Figure 1:
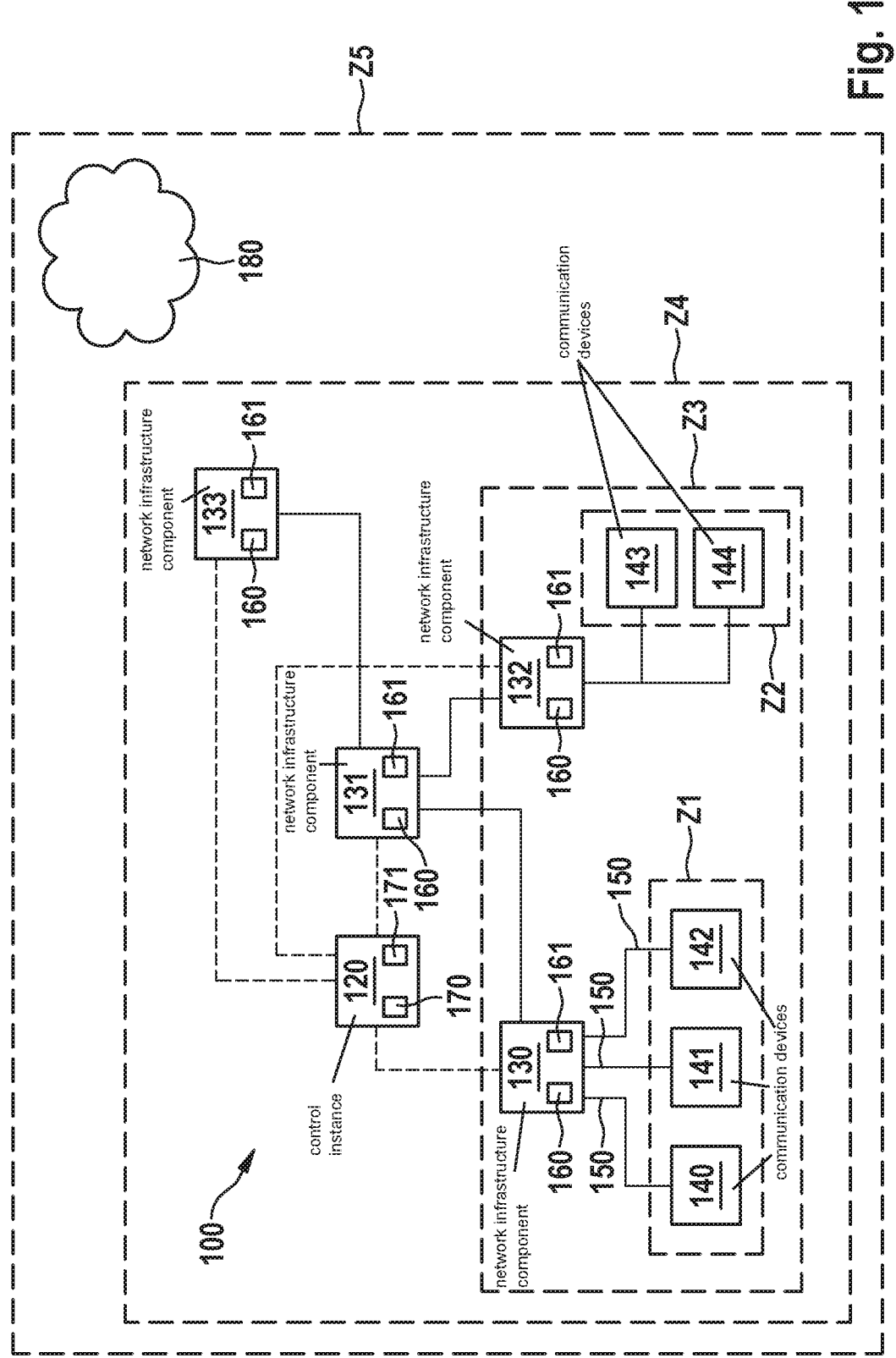
FIG. 1 shows a schematic illustration of parts of a communications system according to preferred specific embodiments of the present invention.

FIG. 1 shows a schematic representation of parts of an example communications system 100 according to the present invention. Communications system 100 includes a control instance 120, which encompasses a software-defined networking (SDN) controller as a logically centralized instance of communications system 100. The SDN controller as the logically centralized instance, especially with regard to the topology, the components of communications system 100, and communications paths 150 between individual components of communications system 100, has a global view on communications system 100. The SDN controller may have a central realization and also a distributed realization. In the same way, the SDN controller may be realized as a subcomponent of some other component of communications system 100.

Via logical connections shown in FIG. 1 in the form of dashed lines, control instance 120 is connected to a first network infrastructure component 130, a second network infrastructure component 131, and a third network infrastructure component 132 of communications system 100.

According to the illustrated specific embodiment, network infrastructure components 130, 131, 132 are developed in the form of switches, in particular as software-defined networking (SDN) switches.

Communications system 100, or parts of communications system 100, is/are developed as an Ethernet, e.g., according to IEEE 802.3. In this case, Ethernet-capable switches are provided.

Communications system 100 or parts of communications system 100 may also be developed as a controller area network, CAN, according to ISO 11898. In such a case, the components denoted by switch 130, 131, 132 in FIG. 1 include forwarding devices, for instance, which communicate according to the CAN protocol and are able to assume the function described for switches 130, 131, 132.

A network infrastructure component 130, 131, 132 includes at least one forwarding rule and is developed to forward data as a function as the forwarding rule to and/or from communications devices 140, 141, 142, 143, 144. Communications devices 140, 141, 142, 143, 144, for example, are user terminals such as control devices (electronic control units, ECU) having application software, sensors, actuators or I/O devices, which exchange data via communications system 100. The forwarding of the data is realized via communications paths 150.

According to the illustrated specific embodiment, network infrastructure component 130 and communications devices 140, 141, 142 form a first subnet of communications system 100, whose parts are able to communicate with one another via network infrastructure component 130. Network infrastructure component 132 and communications devices 143, 144 form a second subnet of communications system 100, whose parts are able to communicate with one another via network infrastructure component 132. For that purpose, a few data are forwarded only within the first or only within the second subnet, for instance.

Each network infrastructure components 130, 131, 132 in the example includes a processing unit 160 and a memory unit 161, in particular a microcontroller, a microprocessor, an application-specific integrated circuit, ASIC, a field programmable gate array, FPGA, or ternary content-addressable memory, TCAM. Control instance 120 also includes a processing unit 170 and a memory unit 171.

Memory units 161, 171 store instructions that when carried out by processing units 160, 170, make it possible to carry out the method described in the following text and schematically shown in FIG. 2.

In a first step of the present method, communications devices 140, 141, 142, 143, 144 are allocated (200) to security zones Z1, Z2, Z3 (FIG. 2).

According to the illustrated specific embodiment, communications devices 140, 141, 142 are allocated to a first security zone Z1, and communications devices 143, 144 are allocated 200 to a second security zone Z2. A security zone Z1, Z2, Z3 is a logical area of communications system 100 featuring uniform security requirements. The allocation to a security zone Z1, Z2, Z3 is also possible in a subnet-spanning manner. For example, communications devices 142, 143, 144 are allocated to a third security zone Z3. The communication into a security zone Z1, Z2, Z3 or out of a security zone Z1, Z2, Z3 is specified by appropriate security requirements and preferably controlled. For instance, a few data may be exchanged only between communications device 143 and communications device 144, i.e. within security zone Z2. Other data, on the other hand, may be exchanged between communications device 143, communications device 144, and communications device 142, i.e. within security zone Z3.

In order to ensure compliance with the security requirements with regard to the data exchange between communications devices 140, 141, 142, 143, 144, forwarding rules for the forwarding of data by network infrastructure component 130, 131, 132 to and/or from communications device 140, 141, 142, 143, 144 are specified 240 (FIG. 2) in a further step of the present method, the specification 240 of the forwarding rules taking place under consideration of security zone Z1, Z2, Z3.

According to one specific embodiment, the present method furthermore includes the forwarding 250 of data as a function of the forwarding rule by network infrastructure component 130, 131, 132.

In this way, the specified forwarding rules ensure that data that are meant only for a specific security zone Z1, Z2, Z3 are unable to leave this security zone Z1, Z2, Z3. In the same way, it may be provided that a communications device 140, 141, 142, 143, 144 outside a certain security zone Z1, Z2, Z3 is prevented from sending data into this security zone Z1, Z2, Z3.

In an advantageous manner, the specification 240 of the forwarding rule for the forwarding of data includes the defining of the forwarding rule. In one preferred specific embodiment, the forwarding rules are defined by control instance 120.

The forwarding rule is advantageously defined as a function of data to be forwarded and/or of at least one communications path 150 of communications system 100 and/or of at least one application of communications system 100.

The specification 240 advantageously includes the distribution of the forwarding rule to network infrastructure component 130, 131, 132. In one preferred specific embodiment, control instance 120 distributes the forwarding rules to corresponding network infrastructure components 130, 131, 132. For this purpose, control instance 120 is connected to network infrastructure components 130, 131, 132 via logical connections, which are shown in FIG. 1 as dashed lines.

The method shown in FIG. 2 advantageously includes the additional following steps: Allocating 220 data to security zones Z1, Z2, Z3, and characterizing 230 data by information that allows the data to be allocated to at least one security zone Z1, Z2, Z3.

Data that are allocated to a certain security zone Z1, Z2, Z3, for example, may be forwarded only inside the specific security zone Z1, Z2, Z3. It would also be possible to transmit only data within a security zone Z1, Z2, Z3 that are allocated to this security zone Z1, Z2, Z3. According to one specific embodiment, this information may be appended to the data, in particular in the form of tags, e.g., using suitable protocol extensions, or the use of VLAN tags. Based on the information allocated to the data, network infrastructure component 130, 131, 132 then recognizes whether or not the data may be forwarded within security zone Z1, Z2, Z3 and/or out of security zone Z1, Z2, Z3 and/or into security zone Z1, Z2, Z3.

According to one specific embodiment, step 220 and/or step 230 of the present method is/are able to be carried out by network infrastructure components 130, 131, 132. This will be described in the following text with reference to the method schematically illustrated in FIG. 3. In a step 300, a network infrastructure component 130, 131, 132 receives data. In a step 310, network infrastructure component 130, 131, 132 allocates the data to a security zone Z1, Z2, Z3. For example, based on information stored in memory units 161 of network infrastructure components 130, 131, 132, network infrastructure components 130, 131, 132 may allocate arriving data to a security zone Z1, Z2, Z3. Control instance 120 is able to define this information, e.g., using datasets including MAC addresses, IP addresses, and data fields, and to distribute it to network infrastructure components 130, 131, 132. Network infrastructure components 130, 131, 132 may furthermore be developed to characterize 230 the data by information that allow for an allocation of the data to at least one security zone Z1, Z2, Z3.

In a step 320, network infrastructure component 130, 131, 132 checks whether a forwarding rule exists for the received data and whether or not the data may be forwarded according to the forwarding rule. Depending on the result, either step 330, i.e. the forwarding of the data, or step 340, i.e. the non-forwarding of the data, is carried out.

In one further specific embodiment, the information of the data characterizing the data is able to be modified, deleted or appended by network infrastructure components 130, 131, 132.

According to FIG. 1, entire communications system 100, i.e. communications devices 140, 141, 142, 143, 144, is allocated to a common security zone Z4. In the automotive context, security zone Z4 could be a "vehicle zone", for example, to which all communications devices 140, 141, 142, 143, 144 of a vehicle are allocated. The security zones are "vehicle domain zones", for example.

In addition, an external instance 180, e.g., a Cloud instance 180, is shown in FIG. 1. Communications system 100 is able to exchange data with Cloud 180 via network infrastructure component 133. Entire communications system 100 and external instance 180 are allocated to security zone Z5, in particular a "Cloud zone". Security zones Z1, Z2, Z3, Z4, Z5 are structured in a hierarchical manner, for instance, vehicle zone Z4 being superposed to vehicle domain zones Z1, Z2, Z3, and Cloud zone Z5 in turn being superposed to vehicle zone Z4. Hierarchical structuring is once again also possible within vehicle domain zones Z1, Z2, Z3. According to the illustrated specific embodiment, security zone Z3 is superposed to security zones Z1 and Z2, for instance. As a matter of fact, any combination and/or hierarchical structuring of security zones Z1, Z2, Z3, Z4, Z5 is/are possible.

In the illustrated specific embodiment, network infrastructure component 133 is a connectivity unit and includes a special internal forwarding device, which is developed to forward data between the two different network technologies. In an advantageous manner, the network component is also developed according to the previously described specific embodiments for forwarding data as a function of the forwarding rules specified by control instance 120.

According to one preferred specific embodiment, the forwarding of the data with regard to security zones Z4, Z5 may be carried out according to the method that was previously described with regard to security zones Z1, Z2, Z3.

In additional preferred specific embodiments, the method described with reference to the flow diagram according to FIG. 2 is provided for the operation of communications system 100. The method according to FIG. 2 is able to be carried out by control instance 120 from FIG. 1, for example, which—or whose functionality—in further preferred specific embodiments may also be integrated into one of communications devices 140, 141, 142, 143, 144, for instance.

In this way, the forwarding rules specified by control instance 120 are able to ensure that data meant only for a certain security zone Z1, Z2, Z3, Z4, Z5 are unable to leave this security zone Z1, Z2, Z3, Z4, Z5. In the same way it may be the case that a communications device 140, 141, 142, 143, 144 outside a security zone Z1, Z2, Z3, Z4, Z5 is prevented from transmitting data into this security zone Z1, Z2, Z3, Z4, Z5.

This is enforced by network infrastructure components 130, 131, 132, 133 on the basis of the forwarding rules defined by control instance 120 and distributed to network infrastructure components 130, 131, 132, 133.

In further preferred specific embodiments, individual steps of the present method, in particular the steps of allocating 200 communications device 140, 141, 142, 143, 144 to a security zone Z1, Z2, Z3, Z4, and/or of allocating 220 data to security zones Z1, Z2, Z3, Z4, Z5, and/or of characterizing 230 data by information that allow the data to be allocated to at least one security zone Z1, Z2, Z3, Z4, Z5, and/or of specifying at least one forwarding rule for the forwarding of data by network infrastructure component 130, 131, 132, 133 to and/or from communications device 140, 141, 142, 143, 144 outside control instance 120, are carried out by other components of communications system 100 or also by external components such as Cloud 180, for instance.

In one further preferred specific embodiment, the present method is carried out in particular for the configuration of communications system 100. Toward this end, the present method or individual steps of the present method may be implemented in different operating states of communications system 100, e.g., prior to the initial operation, and also during a running application of communications system 100 for the reconfiguration, such as through a continuous calculation/optimization or as a reaction to changes in communications system 100.

Changes in communications system 100, for example, are a software update, in particular with regard to new applications, a change in existing applications or the removal of an existing application, a firmware update, e.g. a change in the overall software of a communications device and thus in its applications, the detection of an attack by an intrusion detection system, the change from external accesses to internal data, e.g., from Cloud 180, or by some other change in communications system 100, e.g., partial malfunction or (full) malfunction of communications system 100.

An intrusion detection system is able to detect anomalies in data in the data exchange both in an internal communication within communications system 100 and in an external communication. An intrusion detection system monitors and analyzes the entire data exchange or a portion thereof with the goal of detecting all anomalies in the internal and external data exchange.

According to one further preferred specific embodiment, use scenarios such as software-over-the-air (SOTA), firmware-over-the-air (FOTA) or also the dynamic access to data from Cloud 180 is made easier because of the dynamically adaptable allocation of communications devices 140, 141, 142, 143, 144 to security zones Z1, Z2, Z3, Z4, Z5.

In an advantageous manner, because of the allocation of communications devices 140, 141, 142, 143, 144 to security zones Z1, Z2, Z3, Z4, Z5 at the network level, the security requirements for the data exchange from and into security zones Z1, Z2, Z3, Z4, Z5 are able to be ensured even in the case of compromised applications.

In additional preferred specific embodiments, at least individual steps of the present method are able to be carried out during a running application of communications system 100.

Another specific embodiment provides a "secure-by-default" approach, in which network infrastructure components 130, 131, 132, 133 do not forward data as a matter of principle except for cases for which a forwarding rule is specified for forwarding the corresponding data.

In further preferred specific embodiments, communications system 100 or parts of communications system 100, especially certain security zones Z1, Z2, Z3, Z4, Z5 and/or subnets of communications system 100, is/are able to be deactivated at least temporarily or partially deactivated in order to thereby allow for an accelerated data exchange without checking for compliance with the security requirements.

In additional preferred specific embodiments, data of communications system 100 are able to be transmitted according to time-sensitive networking. Time-sensitive networking denotes an implementation of mechanisms in the communications infrastructure that relate to scheduling, for example. In this context, individual security zones Z1, Z2, Z3, Z4, Z5 or communications devices 140, 141, 142, 143, 144 allocated to security zones Z1, Z2, Z3, Z4, Z5 are able to be allocated to elements of a time-sensitive networking (TSN) schedule in order to thereby have quality-of-service guarantees, in particular guaranteed bandwidths, made available.

What is claimed is:

1. A method for operating a communications system including at least one network infrastructure component and at least one communications device, the at least one network infrastructure component being configured to forward data to and/or from the at least one communications device, the method comprising the following steps:
    allocating the at least one communications device to at least one of a plurality of security zones, wherein each of the plurality of security zones is a logical virtual area of the communications system formed by the allocation;
    specifying at least one forwarding rule that assigns a respective communication, by the at least one communications device within the communications system, to one or more of the plurality of security zones, the assignment limiting a transmission of the communication to being to, from, and/or within the one or more of the plurality of security zones to which the respective communication is assigned; and
    temporarily deactivating one of the security zones so that communications are transmittable within the deactivated one of the security zones during its deactivation without regard to compliance with the at least one forwarding rule, the at least one forwarding rule being required to be complied with for communications in the one of the security zones when the one of the security zones is not deactivated.

2. The method as recited in claim 1, wherein the communications system is based on software-defined network (SDN) and the at least one network infrastructure component is an SDN switch.

3. The method as recited in claim 1, wherein the communications system has at least one first subnet and one second subnet, and a first communications device of the first subnet and a second communications device of the second subnet are allocated to a shared one of the security zones.

4. The method as recited in claim 1, wherein the allocating of the at least one communications device and/or the specifying of the at least one forwarding rule is carried out dynamically during a running application of the communications system.

5. The method as recited in claim 1, wherein the specification of a forwarding rule of the at least one forwarding rule includes distributing the forwarding rule to a network infrastructure component of the at least one network infrastructure component.

6. The method as recited in claim 1, wherein the specification of a forwarding rule of the at least one forwarding rule includes defining the forwarding rule.

7. The method as recited in claim 1, wherein the specification of a forwarding rule of the at least one forwarding rule takes place dynamically during a running application of the communications system.

8. The method as recited in claim 1, further comprising the following step:
    forwarding data to and/or from the at least one communications device as a function of the at least one forwarding rule, by the network infrastructure component.

9. A device for operating a communications system which includes at least one network infrastructure component and at least one communications device, the network infrastructure component being configured for forwarding data to and/or from the at least one network infrastructure component, and the device being configured to:
    allocate the at least one communications device to at least one of a plurality of security zones, wherein each of the plurality of security zones is a logical virtual area of the communications system formed by the allocation;
    specify at least one forwarding rule that assigns a respective communication, by the at least one communications device within the communications system, to one or more of the plurality of security zones, the assignment limiting a transmission of the communication to being to, from, and/or within the one or more of the plurality of security zones to which the respective communication is assigned; and
    temporarily deactivate one of the security zones so that communications are transmittable within the deactivated one of the security zones during its deactivation without regard to compliance with the at least one forwarding rule, the at least one forwarding rule being required to be complied with for communications in the one of the security zones when the one of the security zones is not deactivated.

10. The device as recited in claim 9, wherein the communications system is based on software-defined networking (SDN), and the least one network infrastructure component is an SDN switch.

11. A network infrastructure component of a communications system, the communications system including at least one communications device, the network infrastructure component configured to:
    allocate the at least one communications device to at least one of a plurality of security zones, wherein each of the plurality of security zones is a logical virtual area of the communications system formed by the allocation;
    specify at least one forwarding rule that assigns a respective communication, by the at least one communications device within the communications system, to one or more of the plurality of security zones, the assignment limiting a transmission of the communication to being to, from, and/or within the one or more of the plurality of security zones to which the respective communication is assigned; and skip a check of whether a communication is enabled for transmission within one of the security zones in response to a temporary deactivation of the one of the security zones by which communications are transmittable within the deactivated one of the security zones during its deactivation without regard to compliance with the at least one forwarding rule, the at least one forwarding rule being required to be complied with for communications in the one of the security zones when the one of the security zones is not deactivated.

12. The network infrastructure component as recited in claim 11, wherein the communications system is based on software-defined networking (SDN), and the network infrastructure component is an SDN switch.

13. A non-transitory computer-readable storage medium on which is stored a computer program including computer-readable instructions for operating a communications system including at least one network infrastructure component and at least one communications device, the at least one network infrastructure component being configured to forward data to and/or from the at least one communications device, the computer-readable instructions, when executed by a computer, causing the computer to perform:

allocating the at least one communications device to at least one of a plurality of security zones, wherein each of the plurality of security zones is a logical virtual area of the communications system formed by the allocation;

specifying at least one forwarding rule that assigns a respective communication, by the at least one communications device within the communications system, to one or more of the plurality of security zones, the assignment limiting a transmission of the communication to being to, from, and/or within the one or more of the plurality of security zones to which the respective communication is assigned; and temporarily deactivating one of the security zones so that communications are transmittable within the deactivated one of the security zones during its deactivation without regard to compliance with the at least one forwarding rule, the at least one forwarding rule being required to be complied with for communications in the one of the security zones when the one of the security zones is not deactivated.

14. A communications system, comprising:

at least one communications device;

at least one network infrastructure component configured to forward data to and/or from the at least one network infrastructure component; and a device for operating the communications system, wherein the device is configured to:

allocate the at least one communications device to at least one of a plurality of security zones, wherein each of the plurality of security zones is a logical virtual area of the communications system formed by the allocation;

specify at least one forwarding rule that assigns a respective communication, by the at least one communications device within the communications system, to one or more of the plurality of security zones, the assignment limiting a transmission of the communication to being to, from, and/or within the one or more of the plurality of security zones to which the respective communication is assigned; and temporarily deactivate one of the security zones so that communications are transmittable within the deactivated one of the security zones during its deactivation without regard to compliance with the at least one forwarding rule, the at least one forwarding rule being required to be complied with for communications in the one of the security zones when the one of the security zones is not deactivated.

15. The communications system as recited in claim 14, wherein the communications system is based on software-defined networking (SDN).

16. A method comprising:

providing a device for operating a communications system which includes at least one network infrastructure component and at least one communications device, wherein the network infrastructure component is configured to forward data to and/or from the at least one network infrastructure component, and the device is configured to:

(i) allocate the at least one communications device to at least one of a plurality of security zones, wherein each of the plurality of security zones is a logical virtual area of the communications system formed by the allocation;

(ii) specify at least one forwarding rule that assigns a respective communication, by the at least one communications device within the communications system, to one or more of the plurality of security zones, the assignment limiting a transmission of the communication to being to, from, and/or within the one or more of the plurality of security zones to which the respective communication is assigned; and (iii) temporarily deactivate one of the security zones so that communications are transmittable within the deactivated one of the security zones during its deactivation without regard to compliance with the at least one forwarding rule, the at least one forwarding rule being required to be complied with for communications in the one of the security zones when the one of the security zones is not deactivated; and using the device to control the communications system.

17. The method as recited in claim 1, wherein the assignment is based on a classification of a type of data that is included in the respective communication.

18. The method as recited in claim 1, wherein at least some of the security zones are nested so that the two of the security zones are each entirely included within a third of the security zones, which is defined by allocation of the two of the security zones to the third of the security zones.

19. The method as recited in claim 1, wherein the specifying is performed for the respective communication in response to receipt of the respective communication with an appended tag, and the assignment is based on the tag appended to the respective communication.

* * * * *